Nov. 13, 1962 E. B. SHAND ET AL 3,063,267
METHOD OF MAKING AN ABRADED NECK AMPOULE
Filed Sept. 29, 1955
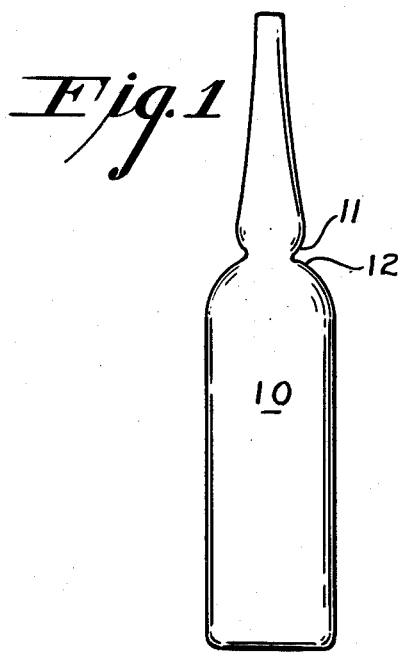
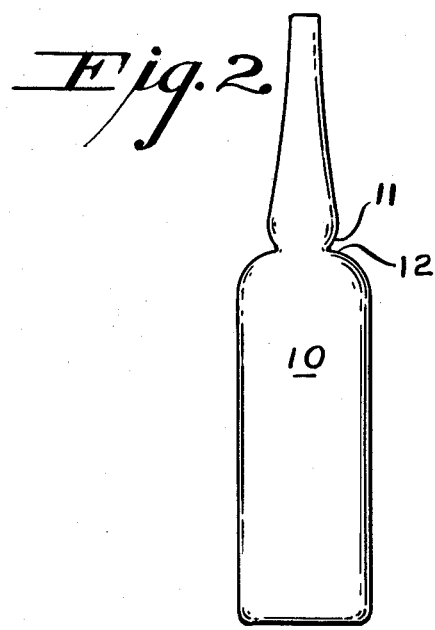
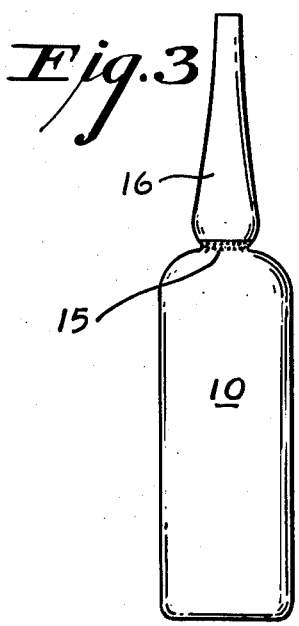
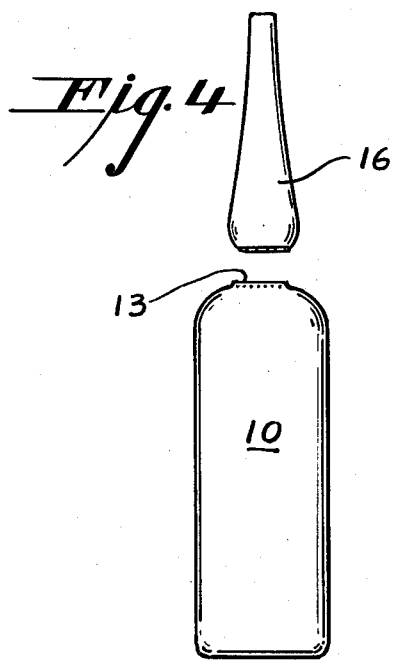
INVENTORS
ERROL B. SHAND
AND COURTLAND C. STANTON
BY Clarence R. Patty, Jr.
ATTORNEY

United States Patent Office 3,063,267
Patented Nov. 13, 1962

3,063,267
METHOD OF MAKING AN ABRADED NECK AMPOULE
Errol B. Shand and Courtland C. Stanton, Corning, N.Y., assignors to Corning Glass Works, Corning, N.Y., a corporation of New York
Filed Sept. 29, 1955, Ser. No. 537,453
4 Claims. (Cl. 65—61)

The present invention relates to ampoules into which sterile solutions to be used for hypodermic purposes and the like are ordinarily sealed, and to methods of their manufacture.

As is well known hypodermic medication requires, as its essential, the most perfect sterility. To this end there have been developed ampoules that have the medicament hermetically sealed therein with provision for breaking the ampoule in a specially provided necked-in or otherwise treated region when the contents are to be used.

The necking in of an ampoule to locate the desired line of severance makes it possible to break the ampoule in the general region thereof by application of a bending force thereto. However, to provide as clean a break as possible, the ampoule is usually also scored or otherwise weakened along a portion of the desired line of fracture. By way of example, reference is made to Davis Patent No. 1,259,964, which shows an ampoule with a necked-in region that has been scored to promote breakage when a suitable bending force is applied. More recently patents have been issued showing the necked-in region weakened by grinding, as illustrated in Davis et al. patent No. 2,318,379; or the necked-in region has been made more susceptible to the action of a file by providing it with file catching serrations, as in O'Sullivan Patent No. 2,486,321.

Structures similar to those described in the aforesaid patents have met with a degree of success, but excessive weakening often results in inadvertent breakage, while insufficient weakening makes breakage difficult and the line of breakage produced by a cutting device such for example as a diamond or by a cutting wheel tends to produce a crack or check the depth of which is difficult to control and usually reduces the breaking stress to 20% or less of the unscored article. Long scores or scratches, particularly if deep, will tend to open up (propagate) over long periods under way very low stress values. Also, easy breakage is effected intentionally only if care is exercised to apply the bending force in a direction to place the scored region under tension rather than compression. For these reasons the use of scoring tools cannot be relied upon to consistently produce the desired results.

An annealed ampoule, grooved along a desired line of separation, usually has checks imparted thereto because the glass surface is chilled by the grooving wheel, enabling fracture in the region of such line by application of a bending force ranging from 3½ to 9 pound inches, depending on the direction of application of the bending force. The great variation in its breaking strength resides in the variation in the depth of surface flaws that may be present in the region of the desired line of separation. The bending force necessary to effect breakage then depends upon the character of the flaw that is put under tension by the bending force. By way of example, if the bending force is such that the break origin is in the area placed under tension, is in a region having very minor or no surface imperfections the bending force required may reach 9 pound inches or more, but if the bending force is such that the break origin is in a region having a major flaw a relatively small bending force will suffice to effect a break.

In effecting the break it is customary for one to do so by grasping the ampoule in the hand and bearing down on the waste portion with the thumb. On occasion, through faulty breakage, injury of the thumb results.

According to the present invention the ampoule is not only substantially necked in along the desired line of breakage as in past practice by heating and mechanically grooving the same, but in addition, while the glass is still workable, the ampoule is subjected to opposing pressure from opposite ends to somewhat compress the glass in the grooved region and thus tends to partially seal over the flaws that may have been created by the grooving wheel and reduces the size of some flaws that may have objectionably brought the breaking value below the desired minimum. By this latter treatment the minimum breaking strength is thus raised to a more desirable value. Moreover, a narrow band of the necked-in region is abraded, conveniently by sand blasting it with an abrasive of a particle size suitable to create flaws in the surface that will eliminate the high breaking strength values in such region, such particle size being at the same time too small to materially affect the low breakage value. In this manner the breakage characteristics of the necked-in region is equalized by a network of small checks of random orientation, imparting thereto the desired substantially uniform breaking value along the entire length of the line of separation. As a thumb protective measure the waste portion of the ampoule is coated with an organic film.

Ampoules may in this fashion conveniently be conditioned for breakage by a bending force of a desired number of pound inches usually, although not necessarily, in the region of the minimum required before sand blasting. Also because of the uniformity of depth of the crevices establishing a substantially uniform breaking characteristic along the entire length of the groove, breakage is more consistently in a plane normal to the ampoule bore than formerly. As will be understood, the foregoing results are obtained without resort to the use of a scoring tool of any kind and without necessarily reducing the initial minimum resistance to breakage attained by a simple necking in operation.

A typical ampoule made in accordance with applicant's method is shown in the accompanying drawing.

FIG. 1 is a side elevation, on an enlarged scale, of an ampoule immediately after a groove has been formed therein.

FIG. 2 is a similar view of the ampoule after it has been compressed in the grooved region.

FIG. 3 is a view similar to FIG. 2 after the grooved region of the ampoule exterior has been abraded and the waste portion has been coated.

FIG. 4 is a view of the ampoule after its fracture.

Referring to FIG. 1, the ampoule 10 is shown with the included angle of the groove walls 11 and 12 as formed by a grooving wheel, whereas in FIG. 2 the ampoule is illustrated as it appears after the glass in the region of the groove has been compressed.

In FIG. 3 the ampoule 10 is shown with an abraded surface or band 15, and with the waste portion above such band bearing a protective coating 16 of cellophane. The desired network of crevices in the ampoule represented by band 15 of proper size and depth may be obtained by bombarding the necked-in region of the ampoule for a suitably selected time period at a constant preselected air pressure, while rotating it about its axial center. Highly satisfactory results have been obtained using aluminum oxide of a mean particle size of twenty-seven microns, and air over a pressure range of 55–75 pounds for a time period of ¼ to ½ second on ampoules whose necked-in regions are of approximately ¼" in diameter. The coating 16 may be conveniently applied by dipping the ampoule in a suitable solution.

As will be noted in FIG. 4, the character of break obtained is such that the fractured surface 13 is substantially normal to the ampoule bore and is quite even and smooth.

As an alternative to the described method, if desired, the flaws created by the grooving wheel may be sealed over by fire polishing. This step may be employed either in substitution for that of subjecting the ampoule to opposing pressure, or may be supplemental to such step. Fire polishing will tend to raise the average breaking value and may be advantageously resorted to when the ampoules being processed tend to have an unusually low minimum breaking value.

What is claimed is:

1. The method of preparing an ampoule for severance along an imaginary line transverse its length, which includes heating the ampoule to a working condition in a region bridging such imaginary line, forming a constriction in the ampoule in a region bridging such imaginary line with the maximum constriction along such line, and equalizing the breaking strength of the ampoule along such line to a desired value by forming a network of checks of predetermined depth over the exterior of the ampoule about the central region of its constricted portion bridging such line throughout its circumference in accordance with the average breaking strength desired by bombarding the same with abrasive particles of a size range in accordance with the breaking strength desired.

2. The method of treating an ampoule, to promote ready breakage thereof along an imaginary desired line of severance by application of a bending force to the ampoule, which includes heating a localized transverse region of the ampoule bridging such imaginary line to a workable temperature, forming an annular groove therein along the desired line of severance with its base bridging the desired line of severance, applying opposing forces to the ends of the ampoule while the grooved region is still workable to narrow the groove width and thereafter imparting uniformity to the breaking characteristics throughout the groove length by abrading the circumference of the ampoule exterior in the region occupied by the base of the groove by bombarding it with an abrasive having a mean particle size of approximately twenty-seven microns at a pressure range of 55–75 pounds for a time period of ¼ to ½ second to form a network of checks of predetermined depth along its entire perimeter.

3. The method of treating an ampoule, to promote ready breakage thereof along a desired line of severance by application of a bending force to the ampoule, which includes heating a localized transverse region of the ampoule to a workable temperature, forming an annular groove therein along the desired line of severance, fire polishing such grooved region, and thereafter abrading the circumference of the ampoule exterior in the region occupied by the base of the groove by bombarding it with an abrasive having a mean particle size of approximately twenty-seven microns at a pressure range of 55–75 pounds for a time period of ¼ to ½ second to form a network of checks of predetermined size and depth thereabout.

4. A method such as defined by claim 2 which includes fire polishing the grooved region before abrading it.

References Cited in the file of this patent

UNITED STATES PATENTS

| | | |
|---|---|---|
| 1,178,257 | Haley | Apr. 4, 1916 |
| 1,274,095 | Smith | July 30, 1918 |
| 1,317,809 | Matz | Oct. 7, 1919 |
| 1,371,668 | Davis | Mar. 15, 1921 |
| 1,951,743 | Thomae | Mar. 20, 1934 |
| 2,311,735 | Cleminson | Feb. 23, 1943 |
| 2,318,379 | Davis et al. | May 4, 1943 |
| 2,486,321 | O'Sullivan | Oct. 25, 1949 |

FOREIGN PATENTS

| | | |
|---|---|---|
| 2,752 | Great Britain | Aug. 8, 1874 |